United States Patent
Liao et al.

(10) Patent No.: US 7,622,514 B2
(45) Date of Patent: Nov. 24, 2009

(54) CURABLE COMPOSITION AND ARTICLE POSSESSING PROTECTIVE LAYER OBTAINED THEREFROM

(75) Inventors: Wen P. Liao, Clifton Park, NY (US); Sean E. Armstrong, East Greenbush, NY (US)

(73) Assignee: Sabic Innovative Plastics IP B.V. (NL)

( * ) Notice: Subject to any disclaimer, the term of this patent is extended or adjusted under 35 U.S.C. 154(b) by 765 days.

(21) Appl. No.: 11/302,850

(22) Filed: Dec. 14, 2005

(65) Prior Publication Data
US 2006/0251906 A1    Nov. 9, 2006

Related U.S. Application Data

(60) Provisional application No. 60/678,989, filed on May 9, 2005.

(51) Int. Cl.
C08K 9/00 (2006.01)
(52) U.S. Cl. .................. 523/212; 523/216; 524/492; 524/493
(58) Field of Classification Search ............. 523/212, 523/216; 524/492, 493
See application file for complete search history.

(56) References Cited

U.S. PATENT DOCUMENTS

| | | | |
|---|---|---|---|
| 5,258,225 A | 11/1993 | Katsamberis |
| 5,426,131 A | 6/1995 | Katsamberis |
| 5,614,321 A | 3/1997 | Medford et al. |
| 5,804,301 A | 9/1998 | Curatolo |
| 5,888,649 A | 3/1999 | Curatolo et al. |
| 5,977,200 A | 11/1999 | Lake |
| 6,077,640 A | 6/2000 | Komai et al. |
| 6,348,537 B2 | 2/2002 | Sugamoto et al. |
| 6,358,601 B1 | 3/2002 | Bilkadi |
| 6,576,320 B2 | 6/2003 | Hayashida et al. |
| 6,596,363 B2 | 7/2003 | Hayashida et al. |
| 6,607,590 B2 | 8/2003 | Jin et al. |
| 6,716,505 B2 | 4/2004 | Dris et al. |
| 6,809,149 B2 | 10/2004 | Meyer et al. |
| 6,855,415 B2 | 2/2005 | Lilly |
| 6,998,425 B2 | 2/2006 | Chisholm et al. |
| 2002/0077381 A1 | 6/2002 | Frahn et al. |
| 2002/0077388 A1 | 6/2002 | Meyer et al. |
| 2003/0134950 A1 | 7/2003 | Kudo et al. |
| 2004/0101688 A1 | 5/2004 | Rubinsztajn et al. |
| 2005/0245633 A1 | 11/2005 | Soutar et al. |
| 2005/0245634 A1 | 11/2005 | Soutar et al. |
| 2006/0063002 A1 | 3/2006 | Edelmann et al. |

FOREIGN PATENT DOCUMENTS

| | | |
|---|---|---|
| EP | 0069133 B1 | 1/1983 |
| GB | 2177093 A | 1/1987 |

OTHER PUBLICATIONS

JP03-014879; Jan. 23, 1991; Abstract Only (1 page).
International Search Report; International Application No. PCT/US2006/015898; Date of Mailing of International Search Report Oct. 10, 2006; (3 pages).

*Primary Examiner*—Edward J Cain
(74) *Attorney, Agent, or Firm*—Cantor Colburn LLP (57) ABSTRACT

A curable composition contains:
a) functionalized colloidal silica obtained from the reaction of surface hydroxyl groups of colloidal silica with at least one functionalizing silane of the general formula:

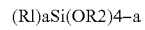

$(R1)_a Si(OR2)_{4-a}$ wherein each R1 is, independently, a monovalent alkyl, cycloalkyl, aryl, alkaryl or aralkyl group of up to 18 carbon atoms, optionally possessing at least one chemically reactive functionality selected from the group consisting of alkenyl, acrylate and epoxy;
b) at least one first curable monomer possessing at least one of alkenyl and acrylate functionality;
c) at least one second curable monomer possessing epoxy functionality;
d) at least one third curable monomer possessing at least one of alkenyl and acrylate functionality together with epoxy functionality, the third curable monomer replacing or supplementing the first and/or second curable monomer, provided, that when the third curable monomer replaces both the first and second curable monomers, the functionalized colloidal silica possesses at least one of alkenyl and acrylate functionality together with epoxy functionality; and, optionally,
e) at least one curing agent for the curable monomer(s).

The composition when cured exhibits scratch and abrasion resistant properties making it particularly well-suited for use as a coating for many different kinds of substrates, e.g., DVD discs and especially the more recent Blu-ray Discs, where these properties are highly desirable or even necessary.

27 Claims, 1 Drawing Sheet

FIG. 1

Taber Abrasion Test Results

CURABLE COMPOSITION AND ARTICLE POSSESSING PROTECTIVE LAYER OBTAINED THEREFROM

CROSS REFERENCE TO RELATED APPLICATION

This application claims the benefit of U.S. provisional application Ser. No. 60/678,989, filed May 9, 2005, the entire contents of which are incorporated by reference herein.

BACKGROUND OF THE INVENTION

This invention relates to a curable composition and, in particular, to a heat and/or radiation-curable protective hardcoat composition for application to an article such as a high capacity optical information storage medium.

A new form of optical information storage medium, the so-called "Blu-ray" Disc (BD) technology, has only recently made its commercial appearance. At present, a Blu-ray optical information storage disc consists of a 1.1 mm substrate layer that is sputtered on one side with a metal or metal alloy as a reflective layer, a thin information layer (for BD-ROM), a recordable layer (for BD-R) or a re-recordable layer (for BD-RE) and, finally, a 100 micron protective topcoat, or cover, layer. The cover layer consists of a relatively expensive solvent-casted polycarbonate (PC) film of approximately 100 microns thickness bonded via an adhesive to the information layer, recordable layer or re-recordable layer, as the case may be, of the substrate. Because this PC film readily scratches and acquires fingerprints, the current commercial version of the Blu-ray Disc is enclosed within a protective cartridge, a component that adds significantly to the cost of the product. The information, recordable or re-recordable layer of a Blu-ray disc is only about 100 microns below its surface therefore thus requiring increased surface integrity compared to that which is acceptable for a conventional compact disc (CD) or digital versatile disc (DVD) surface.

Efforts are currently being made to replace the protective cartridge of a Blu-ray Disc with a protective coating on the disc and even to replacing the PC film used as the cover layer with a lower cost but still effective substitute. PC film is not only an expensive material, it is difficult to assemble in the disc manufacturing process. One approach being considered to improve the Blu-ray Disc technology consists of a 2-layer spincoatable system where a first 94-98 micron layer is spun onto the information-containing 1.1 mm substrate followed by a second 2-6 micron layer hardcoat which provides abrasion resistance and anti-fingerprint properties.

Given the inherent complexities of a 2-layer spincoatable system, it would be highly desirable to combine the two coating operations into a single coating step employing a single coating composition that effectively combines all of the functions of the aforementioned two-coat system.

Abrasion resistance and scratch resistance can in general be achieved with highly crosslinked resins. However, most organic resins shrink upon polymerization. Shrinkage of the cover layer upon curing creates stress between it and the substrate to which it is applied. This stress in turn can create what is referred to as disc tilt. Because of the miniaturization of the information pits and the necessary precision requirement of the laser light, particularly in the case of Blu-ray media, excessive disc tilt must be avoided.

BRIEF DESCRIPTION OF THE INVENTION

In accordance with the present invention, there is provided a curable composition which comprises:

a) functionalized colloidal silica obtained from the reaction of surface hydroxyl groups of colloidal silica with at least one functionalizing silane of the general formula:

$(R^1)_a Si(OR^2)_{4-a}$ wherein each $R^1$ is, independently, a monovalent alkyl, cycloalkyl, aryl, alkaryl or aralkyl group of up to 18 carbon atoms, optionally possessing at least one chemically reactive functionality selected from the group consisting of alkenyl, acrylate and epoxy; each $R^2$ is, independently, a monovalent hydrocarbon radical of up to 18 carbon atoms; and "a" is a whole number of from 1 to 3:

b) at least one first curable monomer possessing at least one of alkenyl and acrylate functionality;

c) at least one second curable monomer possessing epoxy functionality;

d) at least one third curable monomer possessing at least one of alkenyl and acrylate functionality together with epoxy functionality, the third curable monomer replacing or supplementing the first and/or second curable monomer, provided, that when the third curable monomer replaces both the first and second curable monomers, the functionalized colloidal silica possesses at least one of alkenyl and acrylate functionality together with epoxy functionality; and, optionally, e) at least one curing agent for the curable monomer(s).

The presence of functionalized colloidal silica imparts hardness to the cured coating composition herein. Since the functionalized silica particles do not undergo volume change upon curing, the addition of such particles also reduces the shrinkage of the cured composition. When applied to a substrate or article and cured, the composition of this invention provides a scratch and abrasion resistant hardcoat which is especially advantageous for application to a Blu-ray optical information storage medium. When applied to such a medium as its protective cover layer, or hardcoat, the cured coating composition of this invention provides the aforementioned properties of scratch and abrasion resistance and anti-fingerprint capability on the surface of the medium while exhibiting low shrinkage and very little tilt.

The expression "functionalized colloidal silica" as used herein shall be understood to mean a colloidal silica which, by having been rendered hydrophobic, becomes compatible with the curable monomer(s) with which it is admixed to provide the curable composition of the invention, the compatibilization being achieved by chemically reacting the colloidal silica with a silane, referred to herein as a "functionalizing silane", which produces this result. As a result of having been obtained from the reaction of colloidal silica with functionalizing silane, the functionalized colloidal silica component of the curable composition herein may be made to possess organic moieties bonded to the surface of the silica particles that are either essentially chemically inert, e.g., alkyl, cycloalkyl, aryl, alkaryl and aralkyl groups, or are chemically reactive, e.g., alkenyl groups such as allyl and vinyl, acrylate groups, epoxy groups, or combinations of such chemically reactive groups, e.g., acrylate and epoxy groups.

The term "monomer" as used herein shall be understood to include polymerizable compounds whether they be of the non-polymeric, oligomeric or polymeric variety.

The term "acrylate" shall be understood herein to refer to acrylate and/or methacrylate.

While the curable coating composition of this invention is particularly well suited for providing the protective layer of a high capacity optical information storage medium such as a Blu-ray Disc, it is not limited to this application but can be utilized to provide a durable, highly scratch and abrasion resistant coating for numerous other substrates and articles.

DETAILED DESCRIPTION OF THE INVENTION

The curable composition of the invention is obtained by first providing a functionalized colloidal silica. The functionalized colloidal silica is advantageously obtained by reacting a functionalizing silane with a finely divided colloidal silica. The functionalized colloidal silica is thereafter combined with at least one first, second and/or third curable monomer and cured as hereinafter described to provide the cured composition of the invention.

Colloidal silica is commercially supplied as a dispersion of nano-sized silica ($SiO_2$) particles in an aqueous or other solvent medium. The colloidal silica contains up to about 85 weight percent silicon dioxide ($SiO_2$) and typically up to about 80 weight percent silicon dioxide. The nominal median particle size of the colloidal silica is typically in a range of from about 1 to about 250 nanometers (nm) which, for this invention, advantageously does not exceed about 50 nm and more advantageously does not exceed about 25 nm.

Silanes useful for functionalizing colloidal silica include those of the general formula:

$(R^1)_a Si(OR^2)_{4-a}$ wherein each $R^1$ is, independently, a monovalent alkyl, cycloalkyl, aryl, alkaryl or aralkyl group of up to 18 carbon atoms, optionally possessing at least one chemically reactive functionality selected from the group consisting of alkenyl, acrylate and epoxy, and each $R^2$ is, independently, a monovalent hydrocarbon radical of up to 18 carbon atoms and "a" is a whole number of from 1 to 3.

Silanes that can be used for functionalizing colloidal silica include alkyl-, cycloalkyl-, aryl-, alkaryl- and aralkyl-containing silanes such as phenyldimethylmethoxysilane, phenylmethyldimethoxysilane, cyclohexylmethyldimethoxysilane, phenyltrimethoxysilane, methyltrimethoxysilane, and the like; alkenyl-containing silanes, e.g., the vinylalkoxysilanes such as vinylmethyldimethoxysilane, vinylmethyldiethoxysilane, vinyldimethylmethoxysilane, vinyldimethylethoxysilane, vinyltrimethoxysilane, vinyltriethoxysilane, and the like, allylsilanes such as the allylalkyl silanes disclosed in U.S. Pat. No. 5,420,323, including those additionally containing epoxy, specifically, glycidoxy, functionality, and the beta-substituted allylsilanes such as those disclosed in U.S. Pat. No. 4,898,959, the contents of both U.S. patents being incorporated by reference herein; acrylate-containing silanes such as 3-acryloxypropylmethyldiethoxysilane, 3-acryloxyproplymethyldimethoxysilane, 3-acryloxypropyltrimethoxysilane, 2-methacryloxethylmethyldiethoxysilane, 2-methacryloxyethylmethyldimethoxysilane, 2-methacryloxethyltrimethoxysilane, 2-acryloxyethyltrimethoxysilane, 3-methylacryloxypropyl-3-methacryloxypropyltriethoxysilane, 3-acryloxypropyltriethoxysilane, 3-acryloxypropyldimethylethoxysilane, 2-methacryloxyethyltriethoxysilane, 2-acryloxyethyltriethoxysilane, and the like; and, epoxy-containing silanes such as 2-(3,4-epoxycyclohexyl)ethyltrimethoxysilane, 3-glycidoxypropyltrimethoxysilane, 3-acryloxypropylmethyldiethoxysilane, 3-acryloxyproplymethyldimethoxysilane, 3-acryloxypropyltrimethoxysilane, 2-methacryloxethylmethyldiethoxysilane, 2-methacryloxyethylmethyldimethoxysilane, 2-methacryloxethyltrimethoxysilane, 2-acryloxyethyltrimethoxysilane, 3-methylacryloxypropyl-3-methacryloxypropyltriethoxysilane, 3-acryloxypropyltriethoxysilane, 3-acryloxypropyldimethylethoxysilane, 2-methacryloxyethyltriethoxysilane, 2-acryloxyethyltriethoxysilane, and the like.

Functionalized colloidal silica containing two or more different functionalities can be obtained by reacting the colloidal silica with as many different functionalizing silanes with each such silane containing a different functionalizing group. Thus, e.g., colloidal silica can be reacted simultaneously or sequentially with two different silanes, one of which possesses acrylate functionality and the other of which possesses epoxy functionality. It is also within the scope of the invention to functionalize the colloidal silica with a single silane containing two different types of functionality, e.g., allyl and epoxy functionality as in the case of certain of the silanes disclosed in U.S. Pat. No. 5,420,323 referred to above, thus introducing both functionalities into the functionalized colloidal silica.

In general, the colloidal silica can be reacted with from about 5 to about 60 weight percent based thereof of functionalizing silane(s). If desired, the resulting functionalized colloidal silica can be treated with an acid or base to neutralize its pH. An acid or base as well as other catalysts promoting condensation of the silanol groups on the silica particles and the alkoxysilane group(s) on the silane(s) can be used to facilitate the functionalization process. Such catalysts include organotitanium and organotin compounds such as tetrabutyl titanate, titanium isopropoxybis(acetylacetonate), dibutyltin dilaurate, etc., and combinations thereof.

In one embodiment, the functionalization of the colloidal silica can be carried out by adding the functionalizing silane(s) to a commercially available aqueous dispersion of colloidal silica in the weight ratio described above to which an aliphatic alcohol has been added. The resulting composition comprising the colloidal silica and the functionalizing silane(s) in the aliphatic alcohol will be referred to herein as a pre-dispersion. The aliphatic alcohol can be selected from, e.g., isopropanol, t-butanol, 2-butanol methoxypropanol, etc., and combinations thereof. The aliphatic alcohol(s) can be present in an amount of from about 1 to about 10 times the weight of the colloidal silica. In some cases, one or more stabilizers such as 4-hydroxy-2,2,6,6-tetramethylpiperdinyloxy (i.e. 4-hydroxy TEMPO) can be added to this pre-dispersion. In some instances, small amounts of acid or base can be added to adjust the pH of the pre-dispersion. The resulting pre-dispersion is typically heated in a range between about 50° C. and bout 120° C. for a period of from about 1 hour to about 5 hours to effect the reaction of the silane with the silica thereby providing the functionalized colloidal silica.

The cooled pre-dispersion is then further treated to provide a final dispersion of the functionalized colloidal silica by addition of at least one curable monomer which is an aliphatic cyclic acrylate, urethane diacrylate or epoxy resin, and optionally, additional aliphatic solvent which can be selected from, but not limited to, isopropanol, 1-methoxy-2-propanol, 1-methoxy-2-propyl acetate, toluene, etc., and combinations thereof. This final dispersion of the functionalized colloidal silica can be treated with acid or base or with an ion exchange resin to remove acidic or basic impurities, as the case may be. This final dispersion of the functionalized colloidal silica is then concentrated under a vacuum of from about 0.5 Torr to about 250 Torr and at a temperature of from about 20° C. to about 140° C. to remove low boiling materials such as solvent, residual water, etc., the thus-treated concentrated dispersion being referred to herein as a final concentrated dispersion.

If desired, the pre-dispersion or the final dispersion of the functionalized colloidal silica can be further functionalized. In this embodiment, low boiling components are at least partially removed and, subsequently, an appropriate capping agent that will react with residual silanol groups on the surface of the functionalized colloidal silica particles is added to the dispersion in a suitable amount, e.g., from about 0.05 to about 10 times the amount of silica present in the pre-dispersion or final dispersion. Partial removal of low boiling components refers to the removal of at least about 10 weight percent of the total mount of low boiling components, and advantageously, at least about 50 weight percent of the total amount of low boiling components. An effective amount of capping agent caps the functionalized colloidal silica, the capped functionalized colloidal silica being defined herein as a functionalized colloidal silica in which at least about 10 percent, advantageously at least about 20 percent, more advantageously at least about 35 percent, of the free silanol groups present in the corresponding uncapped functionalized colloidal silica have been functionalized by reaction with capping agent. Capping the functionalized colloidal silica effectively can improve the cure of the total curable composition. Formulations which include the capped functionalized colloidal silica typically show better room temperature stability than analogous formulations in which residual silanol groups on the surface of the colloidal silica have not been capped.

Suitable capping agents include hydroxyl-reactive materials such as silylating agents. Examples of a silylating agent include, but are not limited to, hexamethyldisilazane (HMDZ), tetramethyldisilazane, divinyltetramethyldisilazane, diphenyltetramethyldisilazane, N-(trimethylsilyl)diethylamine, 1-(trimethylsilyl)imidazole, trimethylchlorosilane, pentamethylchlorodisiloxane, pentamethyldisiloxane, etc., and combinations thereof. The transparent dispersion is then heated in a range of from about 20° C. to about 140° C. for a period of time ranging from about 0.5 hours to about 48 hours. The resultant mixture is then filtered. If the pre-dispersion was reacted with capping agent, the curable monomer referred to above is added to form the final dispersion. The mixture of functionalized colloidal silica and curable monomer(s) is concentrated at a pressure of from about 0.5 Torr to about 250 Torr to form the final concentrated dispersion. During this process, lower boiling components such as solvent, residual water, byproducts of the capping agent, excess capping agent, and the like, are substantially removed.

Following its preparation, the functionalized colloidal silica component of the curable composition is combined with at least one first curable monomer possessing at least one of alkenyl and acrylate functionality, at least one second curable monomer possessing epoxy functionality and, optionally, at least one third curable monomer possessing at least one of alkenyl and acrylate functionality together with epoxy functionality, either to replace or supplement the alkenyl- and/or acrylate-containing first monomer(s) and/or the epoxy-containing second monomer(s) or, when the functionalized colloidal silica contains at least one of alkenyl and acrylate functionality together with epoxy functionality, as a total replacement for both the first and second monomer(s). Following the curing of the monomer(s), the cured composition will contain functionalized colloidal silica tightly bound within the resulting polymer(s) thus providing a durable scratch and abrasion-resistant material well suited to providing a protective cover or coating for many different types of substrates and articles including the aforementioned high capacity optical storage media such as the Blu-ray Disc.

When the functionalized colloidal silica contains both alkenyl and/or acrylate functionality and epoxy functionality and the curable monomer(s) added thereto to provide the curable composition herein are multifunctional (necessarily the case with the third curable monomer), the functionalized colloidal silica will become chemically integrated into the structures of the polymer that forms as a result of the curing of the composition. For some applications such as providing the protective hardcoat of a Blu-ray disc, this chemically integrated silica/polymer composition can be particularly advantageous.

Useful alkenyl- and/or acrylate-containing first curable monomers that can be incorporated in the curable composition of the present invention include the mono-, di-, tri-, tetra- and higher functionality acrylates numerous specific examples of which are well known in the art.

Useful acrylate monomers include the monoacrylates, in particular, alkylacrylates such as methyl acrylate, propyl acrylate, butylacrylate, methylmethacrylate, propylmethacrylate, butylmethacrylate, ethylhexylmethacrylate, etc., 2-(2-ethoxyethoxy) ethyl acrylate, 2-phenoxyethyl acrylate, 2-phenoxyethyl methacrylate, alkoxylated lauryl acrylate, alkoxylated phenolacrylate, alkoxylated phenolmethacrylate, alkoxylated tetrahydrofurfuryl acrylate, caprolactone acrylate, cyclic trimethylolpropane formal acrylate, dicyclopentadienyl methacrylate, ethoxylated (10) hydroxyethyl methacrylate, ethoxylated (4) nonyl phenol acrylate, ethoxylated (4) nonyl phenol methacrylate, ethoxylated nonyl phenol acrylate, isobornyl acrylate, isobornyl methacrylate, isodecyl acrylate, isodecyl methacrylate, isooctyl acrylate, lauryl acrylate, lauryl methacrylate, methacrylate functional monomer, methoxy polyethylene glycol (350) monoacrylate, methoxy polyethylene glycol (350) monomethacrylate, methoxy polyethylene glycol (550) monoacrylate, methoxy polyethylene glycol (550) monomethacrylate, polyurethane acrylate, polyurethane methacrylate, octyldecyl acrylate, polypropylene glycol monomethacrylate, propoxylated (2) allyl methacrylate, stearyl acrylate, stearyl methacrylate, tetrahydrofurfuryl acrylate, tetrahydrofurfuryl methacrylate, tridecyl acrylate, tridecyl methacrylate, and the like.

Useful diacrylates include 1,3-butylene glycol diacrylate, 1,3-butylene glycol dimethacrylate, 1,4-butanediol diacrylate, 1,4-butanediol dimethacrylate, 1,6-hexanediol diacrylate, 1,6-hexanediol dimethacrylate, alkoxylated cyclohexane dimethanol diacrylate, alkoxylated cyclohexane dimethanol diacrylate, alkoxylated cyclohexane dimethanol dimethacrylate, alkoxylated hexanediol diacrylate, alkoxylated hexanediol dimethacrylate, alkoxylated neopentyl glycol diacrylate, alkoxylated neopentyl glycol dimethacrylate, cyclohexane dimethanol diacrylate, cyclohexane dimethanol dimethacrylate, diethylene glycol diacrylate, diethylene glycol dimethacrylate, dipropylene glycol diacrylate, dipropylene glycol dimethacrylate, ethoxylated (10) bisphenol A diacrylate, ethoxylated (1) bisphenol A dimethacrylate, ethoxylated (2) bisphenol A diacrylate, ethoxylated (2) bisphenol A dimethacrylate, ethoxylated (3) bisphenol A diacrylate, ethoxylated (3) bisphenol A dimethacrylate, ethoxylated (30) bisphenol A diacrylate, ethoxylated (30) bisphenol A dimethacrylate, ethoxylated (4) bisphenol A diacrylate, ethoxylated (4) bisphenol A dimethacrylate, ethoxylated (8) bisphenol A dimethacrylate, ethoxylated (8) bisphenol A dimethacrylate, ethoxylated (6) bisphenol A dimethacrylate, ethoxylated (6) bisphenol A dimethacrylate, ethylene glycol diacrylate, ethylene glycol dimethacrylate, neopentyl glycol diacrylate, neopentyl glycol dimethacrylate, polyethylene glycol (200) diacrylate, polyethylene glycol (200) dimethacrylate, polyethylene glycol (400) diacrylate, polyethylene glycol (400) dimethacrylate, polyethylene glycol (600) diacrylate, polyethylene glycol (600) dimethacrylate, polypropylene (400) diethacrylate, polypropylene glycol (400) dimethacrylate, propoxylated (2) neopentyl glycol diacrylate, propoxylated (2) neopentyl glycol dimethacrylate, tetraethylene glycol diacrylate, tetraethylene glycol dimethacrylate, tricyclodecane dimethanol diacrylate, tricyclodecane dimethanol dimethacrylate, triethylene glycol diacrylate, triethylene glycol dimethacrylate, tripropylene glycol diacrylate, tripropylene glycol dimethacrylate, and the like.

Among the trifunctional acrylates that can be used herein are ethoxylated (15) trimethylolpropane triacrylate, ethoxylated (3) trimethylolpropane triacrylate, ethoxylated (15) trimethylolpropane triacrylate, ethoxylated (6) trimethylolpropane triacrylate, ethoxylated (9) trimethylolpropane triacrylate, ethoxylated (20) trimethylolpropane triacrylate, highly propoxylated (5.5) glyceryl triacrylate, low viscosity trimethylolpropane triacrylate, pentaerythritol triacrylate, propoxylated (3) glyceryl triacrylate, propoxylated (3) glyceryl trimethacrylate, propoxylated (3) trimethylolpropane triacrylate, propoxylated (6) trimethylolpropane triacrylate, trimethylolpropane triacrylate, trimethylolpropane trimethacrylate, tris (2-hydroxyethyl) isocyanurate triacrylate, tris (2-hydroxyethyl) isocyanurate triacrylate, and the like.

Useful tetra- and higher functionality acrylates and methacrylates that can be used herein include ditrimethylolpropane tetraacrylate, dipentaerythritol pentaacrylate, ethoxylated (5) pentaerythritol tetraacrylate, low viscosity dipentaerythritol pentaacrylate, pentaacrylate ester, pentaerythritol tetraacrylate, and the like.

Additional useful multifunctional acrylates include polyester and alkyl (novolac) acrylates, e.g., those disclosed in U.S. Pat. No. 6,714,712, the entire contents of which are incorporated by reference herein, and the urethane diacrylates, in particular those obtained by reacting an isocyanate-terminated polyurethane derived from a polyether diol or polyester diol and an organic diisocyanate such as isophorone diisocyanate with an active hydrogen-containing acrylate such as hydroxyethylacrylate or hydroxyethylmethacrylate. Especially useful are the urethane diacrylates of commerce diluted with another acrylate of lower viscosity to provide an acrylate monomer mixture of more readily manageable viscosity.

Epoxy-containing second curable monomers (i.e., epoxides) that are suitable for use herein include any of those containing at least one epoxy functionality and, advantageously those containing more than one epoxy functionality. Examples of such epoxy-containing monomers include glycidyl esters of mono- and dicarboxylic acids, alkyl glycidyl ethers such as butyl glycidyl ether, phenylglycidyl ether, 2-ethylhexyl glycidyl ether, 3-cyclohexenylmethyl-3-cyclohexenylcarboxylate diepoxide, 2-(3,4-epoxy)cyclohexyl-5,5-spiro-(3,4-epoxy)cyclohexane-m-dioxane, 3,4-epoxycyclohexylmethyl-3,4-epoxycyclohexanecarboxylate, 3,4-epoxy-6-methycyclohexylmethyl-3,4-epoxy-6-methylcyclohexanecarboxylate, vinyl cyclohexanedioxide, bis(3,4-epoxycyclohexylmethyl)adipate, bis(3,4-epoxy-6-methylcyclohexylmethyl)adipate, exo-exo bis(2,3-epoxycyclopentyl) ether, endo-exo bis(2,3-epoxycyclopentyl) ether, 2,2-bis(4-(2,3-epoxypropoxy)cyclohexyl)propane, 2,6-bis (2,3-epoxypropoxycyclohexyl-p-dioxane), 2,6-bis(2,3-epoxypropoxy)norbornene, the diglycidylether of linoleic acid dimer, limonene dioxide, 2,2-bis(3,4-epoxycyclohexyl)propane, dicyclopentadiene dioxide, 1,2-epoxy-6-(2,3-epoxypropoxy)hexahydro-4,7-methanoindane, p-(2,3-epoxy) cyclopentylphenyl-2,3-epoxypropylether, 1-(2,3-epoxypropoxy)phenyl-5,6-epoxyhexadydro-4,7-methanoindane, o-(2,3-epoxy)cyclopentylphenyl-2,3-epoxypropyl ether), 1,2-bis(5-(1,2-epoxy)-4,7-hexahydromethanoindanoxyl)ethane, cyclopentenylphenyl glycidyl ether, cyclohexanediol diglycidyl ether, diglycidyl hexahydrophthalate, diglycidyl ethers of bisphenol A and bisphenol F, alkyl glycidyl ethers; alkyl- and alkenyl-glycidyl esters; alkyl-, mono- and poly-phenol glycidyl ethers; polyglycidyl ethers of pyrocatechol, resorcinol, hydroquinone, 4,4'-dihydroxydiphenyl methane, 4,4'-dihydroxy-3,3'-dimethyldiphenyl methane, 4,4'-dihydroxydiphenyl dimethyl methane, 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris (4-hydroxyphyenyl)methane; polyglycidyl ethers of the chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms; phenol novolac epoxy resin; cresol novolac epoxy resin, sorbitol glycidyl ether, and the like.

Useful curable third monomers containing at least one of alkenyl and acrylate functionality together with epoxy functionality include allyl glycidyl ether, vinyl glycidyl ether, glycidyl acrylate, glycidyl methacrylate, phenol novolac epoxide acrylate and methacrylate, cresol novolac epoxide acrylate and methacrylate, bisphenol A epoxide acrylate and methacrylate, and the like.

The amount of functionalized colloidal silica and first, second and/or third curable monomer(s) in the curable composition of the invention can vary widely herein. For example, the weight amounts of functionalized colloidal silica and total monomer in a curable composition can be as presented in Table 1 below.

TABLE 1

Ranges of Amounts of Functionalized Colloidal Silica and Monomer(s) in the Curable Composition

| Component | First Embodiment, wt. % | Second Embodiment, wt. % | Third Embodiment, wt. % |
|---|---|---|---|
| Functionalized Colloidal Silica | 5-80 | 10-70 | 20-60 |
| Total of first, second and/or third monomer | 95-20 | 90-30 | 80-40 |
| First Monomer, as percent of total monomer | 5-95 | 10-90 | 20-80 |
| Second monomer, as percent of total monomer | 5-95 | 10-90 | 20-80 |
| Third monomer, as percent of total monomer | 0.5-10 | 1-8 | 2-6 |

Numerous other curable compositions can be prepared in accordance within the scope of the invention. For example, when the functionalized colloidal silica lacks at least one of alkenyl, acrylate and epoxy functionality, both first and second curable monomer(s) will be present, e.g., in the amounts indicated above, with the third monomer being omitted entirely or, if desired, being present in an amount such as any of those indicated. However, when the functionalized colloidal silica contains at least one of alkenyl and acrylate functionality together with epoxy functionality, the entire monomer content of the curable composition can be made up of third monomer(s) or, if desired, a relatively large amount of third monomer(s) in admixture with a relatively small amount of first monomer(s), second monomer(s) or mixture of first and second monomers.

While the curable coating composition of the present invention will over time provide a hardcoat film at ambient conditions, optimum results are achieved by the application of heating and/or the use of a free radical curing agent. The curable composition can be cured by an energetic free radical generator such as ultraviolet light, electron beam or gamma radiation, or by one or more chemical free radical generators such as azo compounds and peroxides. The composition can be ultraviolet light-cured if one or more photoinitiators is added prior to curing. There are no special restrictions on the nature of the useful photoinitiators provided they generate radicals by the absorption of energy. Ultraviolet light-sensitive photoinitiators or blends of initiators used in the UV cure of the present curable composition include 2-hydroxy-2-methyl-1-phenyl-propan-1-one (Darocur 1173, Ciba Specialty Chemicals) and 2,2 dimethoxy-2-phenyl-acetol-phenone (Irgacure 651, Ciba Specialty Chemicals).

Additional curing agents include onium catalysts such as bisaryliodonium salts (e.g. bis(dodecylphenyl)iodonium hexafluoroantimonate, (octyloxyphenyl, phenyl)iodonium hexafluoroantimonate, bisaryliodonium tetrakis(pentafluorophenyl) borate), triarylsulphonium salts, and combinations thereof. Preferably, the catalyst is a bisaryliodonium salt. Optionally, an effective amount of free-radical generating compound(s) such as the aromatic pinacols, benzoinalkyl ethers, organic peroxides, and combinations thereof, can be added as optional reagent(s). The free radical generating compound or mixture of such compounds facilitates decomposition of onium salts at a lower temperature.

Also useful herein as curing agents for epoxy resin monomer(s) are the superacid salts, e.g., the urea-superacid salts disclosed in U.S. Pat. No. 5,278,247, the entire contents of which are incorporated by reference herein.

In general, from about 0.05 to about 5 weight percent based on the total solids in the composition of the foregoing curing agents will cause the composition herein to cure.

As those skilled in the art will appreciate, the curable composition herein can contain one or more other optional ingredients such as surface treatment agents, surfactants, antistatic agents (e.g., conductive polymers), leveling agents, UV absorbers, stabilizers, antioxidants, fillers, lubricants, pigments, dyes, plasticizers, suspending agents, and the like, in known and conventional amounts. Silicone fluids and fluoro surfactants that impart low surface tension may be further included in the coating composition to increase surface slippage that in turn improves abrasion resistance. The addition of the low surface tension materials also impart enhanced antifingerprint properties as indicated by increased contact angles.

The cured composition of the present invention in adherent contact with a substrate or article confers scratch and abrasion resistance and antifingerprint properties thereto. A principal application of the cured composition is that of a protective coating, or hardcoat, for any of a variety of substrates and articles, e.g., thermoplastics generally, metals and metal alloys, glass and other ceramics, wood, etc., where the composition can function as the topcoat or as an intermediate coat of such substrate or article.

The following examples are illustrative of the curable and cured composition of the invention and optical discs coated therewith. In these examples, a series of curable coating compositions were prepared and applied to substrates, specifically, discs fabricated from polycarbonate OQ1030 (GE Plastics) and Noryl® (GE Plastics: blend of polyphenylene oxide (PPO) and polystyrene (PS)), to about 70-100 microns thickness. The curable coating compositions were applied to the raw substrates and substrates sputtered with aluminum or silver alloy. Hardness of the cured coatings was measured using the Pencil Hardness (ASTM D3363). Tilt was measured using a Dr. Schenk PROmeteus MT-146/Blu-ray instrument. Table Tilt was also determined in some cases. The Table Tilt test involves placing a disc on a flat surface with the concave side up and the center of the disc in contact with the flat surface and measuring the angle between the bottom of the disc along the radial and the flat surface. A negative tilt is observed when the disc tilts toward the coating side and positive tilt is observed when the disc tilts toward the substrate side.

Typical cure conditions for the examples that follow involved the use of a Fusion D or H bulb with a set intensity ranging between 0.384-2.8 W/cm$^2$ and a dosage of 0.304-2 J/cm$^2$ or Xenon Flash Bulb. Typical spin coat conditions in these examples included a spin rate of about 500-3000 rpm for 1-30 seconds to yield an approximately 70-100 micron thick coating of curable composition.

EXAMPLE 1

To a 5 liter 3-neck flask equipped with a thermometer, a condenser, and an overhead stirrer were charged 1040 g aqueous colloidal silica (Nalco 1034A from Nalco Company) containing 34 weight percent SiO$_2$ in water, 1460 g isopropanol, 0.816 g 4-hydroxy-2,2,6,6-tetramethyl-1-piperidinol-n-noxyl and 156 g methacryloxypropyltrimethoxysilane as functionalizing silane. The mixture was heated to 80° C. for 2 hours and then allowed to cool to 30° C. before charging 720 g methoxypropanol and, as another functionalizing silane, 380 g tricyclodecane dimethanol diacrylate (SR833S from Sartomer Company). The solvents were removed by vacuum distillation. Complete removal of solvents was accomplished by heating the batch to 60° C. for 0.5 hr under full vacuum. The resulting concentrated pre-dispersion contained about 55 weight percent functionalized nanoparticles of colloidal silica.

EXAMPLE 2

To a 5 liter 3-neck flask equipped with a thermometer, a condenser, and an overhead stirrer were charged 1040 g aqueous colloidal silica (Nalco 1034A from Nalco Company), containing 34 weight percent SiO$_2$ in water, 1460 g isopropanol, 0.816 g 4-hydroxy-2,2,6,6-tetramethyl-1-piperidinol-n-noxyl and 156 g methacryloxypropyltrimethoxysilane. The mixture was heated to 80° C. for 2 hours and then allowed to cool to 30° C. before charging 720 g methoxypropanol and 291 g tricyclodecane dimethanol diacrylate (SR833S from Sartomer Company). The solvents were removed by vacuum distillation. Complete removal of solvents was accomplished by heating the batch to 60° C. for 0.5 hr under full vacuum. The resulting concentrated pre-dispersion contained about 61.5 weight percent functionalized colloidal silica nanoparticles.

EXAMPLE 3

A curable coating composition was prepared by mixing 150 g of the functionalized colloidal silica pre-dispersion of Example 1 with 18.92 g of 3,4-epoxycyclohexylmethyl-3,4-epoxycyclohexanecarboxylate (Cyracure™ UVR6105 from Dow Chemical), 1.21 g glycidyl methacrylate (GMA) (from Dow Chemical), 3.3 g of an acrylate polyol (Joncryl 587 from Johnson Polymer), 0.95 g of a cationic photoinitiator UVI6976 (from Dow Chemical), and 15.98 g of a free radical photoinitiator (Darocur 1173 from Ciba Specialty Chemicals). The mixture appeared optically clear and possessed a viscosity of 930 cps at 25° C. The curable composition was spincoated on a OQ1030 polycarbonate disc. The cured coating was 70 microns thick and had a Pencil Hardness of 7H. The disc was slightly negatively tilted after standing in an ambient condition overnight. The contact angle of deionized water on the cured disc was 68°.

EXAMPLES 4-7

Curable coating compositions were prepared by mixing the functionalized colloidal silica pre-dispersion of Example 2 with the monomers and photoinitiators set forth in Table 2 at ambient conditions. Each curable composition was applied to a disc and cured under the conditions described above. The results of the Pencil Hardness and Table Tilt tests carried out upon the discs are set forth in Table 2.

TABLE 2

Pencil Hardness and Table Tilt Test Results

| | Example | | | |
|---|---|---|---|---|
| | 4 | 5 | 6 | 7 |
| Functionalized Colloidal Silica | 82.44 | 79.12 | 75.75 | 72.25 |
| UVR6105 | 7.47 | 9.98 | 12.51 | 15.21 |
| GMA | 0.48 | 0.64 | 0.80 | 0.97 |
| UVI6976 | 0.37 | 0.50 | 0.63 | 0.76 |
| Joncryl 587 | 0.99 | 1.33 | 1.67 | 1.96 |
| Darocur 1173 | 8.24 | 8.43 | 8.64 | 8.85 |
| Total | 100.00 | 100.00 | 100.00 | 100.00 |
| Thickness, microns | 73 | 75 | 70 | 70 |
| Pencil Hardness | 7H | 7H | 7H | 7H |
| Table Tilt | slightly negative | no tilt | no tilt | slightly positive |

These examples demonstrate that it is advantageous to provide a good balance of epoxy-containing and acrylate-containing monomers in the coating composition in order to produce low tilt in the coated discs. At low epoxy levels, the coated discs tilted negatively while at high epoxy levels, the coated discs tilted positively after curing. When the acrylate and epoxy levels are well balanced, the coated discs remain flat following curing. The optimum balance in acrylate and epoxy levels can be readily determined for a particular curable composition employing routine testing.

EXAMPLES 8-10

Curable coating compositions were prepared by mixing the functionalized colloidal silica pre-dispersion of Example 2 with the monomers and photoinitiators in the amounts set forth in Table 3 at ambient conditions. Each composition was applied to a disc and cured under the conditions described above. The results of the Table Tilt and Pencil Hardness tests carried out upon the discs are set forth in Table 3.

TABLE 3

Table Tilt and Pencil Hardness Test Results

| | Example | | |
|---|---|---|---|
| | 8 | 9 | 10 |
| UVR6110[1] | 8.04 | 7.77 | 8.24 |
| GMA | 0.49 | 0.47 | 0.50 |
| UVI6992[2] | 0.66 | 0.64 | 0.67 |
| Example 2 | 82.58 | 79.28 | 77.29 |
| Joncryl 587 | | 3.79 | 5.47 |
| Darocur 1173 | 8.24 | 8.05 | 7.83 |
| Total | 100 | 100 | 100 |
| Table Tilt, degrees | 0 | 0.19 | 0.03 |
| Pencil Hardness | 7H | 7H | 7H |

[1]Cyracure ™ UVR6110 is 3,4-epoxycyclohexylmethyl-3,4-epoxycyclohexanecarboxylate from Dow Chemical.
[2]Cyracure ™ UVI6992 is a cationic photoinitiator from Dow Chemical.

EXAMPLE 11

A curable coating composition was prepared by mixing 3.07 g of an epoxy novolac (ESCN 195-25, from Sumitomo Chemical), 10.28 g bisphenol A diglycidyl ether (DER 332 from Dow Chemical), 0.53 g glycidyl methacrylate (GMA) (from Dow Chemical), 8.9 g FCS100 prepared with methacryloxypropyltrimethoxysilane functionalized colloidal silica from GE Advanced Materials-Silicones dispersed in hexanedioldiacrylate, 1.09 g Cyracure™UVI6992 cationic photoinitiator (from Dow Chemical), and 0.36 g Darocur 1173 radical photoinitiator (from Ciba Specialty Chemicals). The curable composition was spincoated on OQ1030 polycarbonate discs and UV-cured. The cured coating exhibited a Pencil Hardness of 8H.

EXAMPLES 12-15

These examples demonstrate that the addition of functionalized colloidal silica improves the Pencil Hardness of the cured coating composition and reduces disc tilt.

The curable coating compositions were prepared by mixing the indicated components in the amounts shown in Table 4 at ambient conditions. Blu-ray discs were made by spincoating the curable compositions on OQ1030 polycarbonate discs followed by UV-curing. The Pencil Hardness and Table Tilt test results are set forth in Table 4.

TABLE 4

Pencil Hardness and Table Tilt Test Results

| | Example | | | |
|---|---|---|---|---|
| | 12 | 13 | 14 | 15 |
| FCS100 | | 20 | 40 | 60 |
| DER 332 | 78.13 | 62.50 | 46.88 | 31.25 |
| Castor oil | 7.81 | 6.25 | 4.69 | 3.13 |
| GMA | 4.69 | 3.75 | 2.81 | 1.88 |
| UVI6992 | 6.25 | 5.00 | 3.75 | 2.50 |
| Darocur 1173 | 3.13 | 2.50 | 1.88 | 1.25 |
| Total | 100 | 100 | 100 | 100 |
| Pencil hardness | 6H | 6H | 7H | 7H |
| Table tilt | slightly+ | v. slighly+ | No tilt | No tilt |

EXAMPLE 16

To a 5 liter 3-neck flask equipped with a thermometer, a condenser, and an overhead stirrer were charged 1040 g aqueous colloidal silica (Nalco 1034A from Nalco Company) containing 34 weight percent $SiO_2$ in water, 1460 g isopropanol, 0.82 g 4-hydroxy-2,2,6,6-tetramethyl-1-piperidinol-n-noxyl and 156 g methacryloxypropyltrimethoxysilane. The mixture was heated to 80° C. for 2 hours. The batch was allowed to cool to 30° C. and thereafter charged with 720 g methoxypropanol and 240 g tricyclodecane dimethanol diacrylate (SR833S from Sartomer Company). The solvents were removed by vacuum distillation. The batch was gradually heated to, and held at, 60° C. for 0.5 hr under full vacuum to completely remove the solvents and provide a concentrated pre-dispersion. To the solvent-free pre-dispersion was charged 160.8 g Cyracure™ UVR6105, 10.28 g glycidyl methacrylate and 169.6 g pre-dissolved solution of 30 weight percent Joncryl 587 in acetone. Acetone was removed from the mixture by vacuum distillation at 50° C. After the batch was allowed to cool to 30° C., 7.72 g of Cyracure UVI6992 and 52.9 g of Darocur 1173 were added and the batch was mixed until homogeneous to provide a curable composition.

Figure 1:
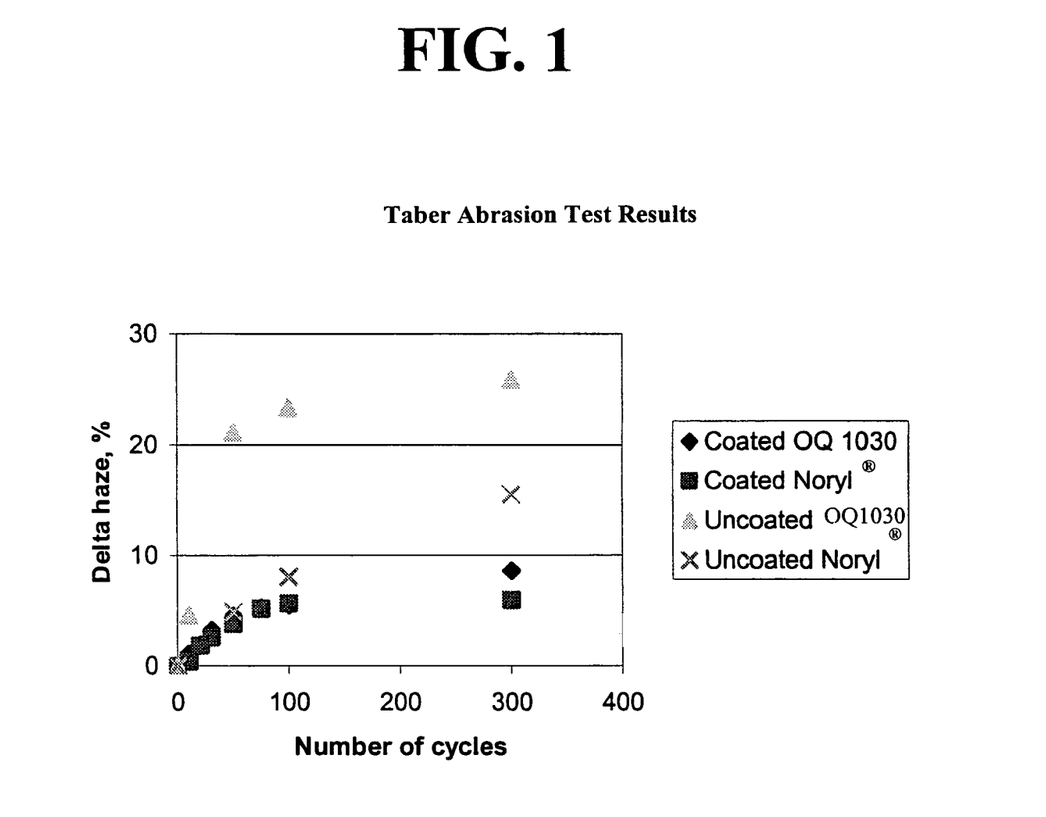
FIG. 1 shows the Taber abrasion results for various coated optical information storage discs both within and outside the scope of the invention.

Aluminum and silver sputtered OQ1030 polycarbonate and Noryl® discs were spincoated with the foregoing curable composition and cured under UV light. The cured coatings had a Pencil Hardness of greater than 9H and low delta radial deviation as shown in Table 5. The coatings also exhibited excellent Taber abrasion as shown by the data presented in FIG. 1.

TABLE 5

| Delta Radial Deviation of Cured Coatings | |
| --- | --- |
| OQ1030 polycarbonate - Al sputtered | −0.23 |
| OQ1030 polycarbonate - Ag alloy sputtered | −0.15 |
| Noryl ® - Al sputtered | −0.21 |
| Noryl ® - Ag alloy sputtered | −0.71 |

EXAMPLES 17-24

Examples 17-24 demonstrate the improvement in contact angles (a measure of fingerprint resistance) of a cured coating in accordance with the invention by the addition to the curable composition of silicone leveling agents (BYK 353, BYK 356, BYK 322, BYK 371 and BYK 300 of BYK Chemical Company) and fluorosurfactants (Zonyl 9361, Zonyl FSJ and Zonyl FSP from E.I. DuPont De Nemours & Co.). The silicone leveling agents (surfactants) and fluorosurfactants were mixed with the curable composition of Example 3 and spincoated on OQ1030 polycarbonate discs. After UV-radiation curing, the contact angles of a 1 microliter deionized water drop on each coating composition was measured. As a comparison, the contact angle of the cured coating composition of Example 3 was 68°. As shown in Table 6, the addition of the low surface tension surfactants significantly increased the contact angles.

TABLE 6

Contact Angle Measurements

| | Example | | | | | | | |
| --- | --- | --- | --- | --- | --- | --- | --- | --- |
| | 17 | 18 | 19 | 20 | 21 | 22 | 23 | 24 |
| | BYK353 | BYK356 | BYK322 | BYK371 | BYK300 | Zonyl 9361 | Zonyl FSJ | Zonyl FSP |
| Surfactant | 0.5 | 0.5 | 0.5 | 0.5 | 0.5 | 0.5 | 0.5 | 0.5 |
| Coating of Example 3 | 100 | 100 | 100 | 100 | 100 | 100 | 100 | 100 |
| Contact angle, degrees | 93.4 | 92.4 | 97.5 | 99 | 92.3 | 82.5 | 85.9 | 81.2 |

EXAMPLES 25-29

To a 5 liter 3-neck flask equipped with a thermometer, a condenser, and an overhead stirrer were charged 1040 g aqueous colloidal silica (Nalco 1034A from Nalco) containing 34 weight percent $SiO_2$ in water, 1040 g methoxypropanol, 0.816 g 4-hydroxy-2,2,6,6-tetramethyl-1-piperidinol-n-noxyl and 156 g methacryloxypropyltrimethoxysilane. The mixture was heated to 80° C. for 2 hours. The batch was cooled to 30° C. and thereafter charged with 720 g methoxypropanol and 380 g tricyclodecane dimethanol diacrylate (SR833S from Sartomer Company). The solvents were removed by vacuum distillation. The batch was heated to 60° C. for 0.5 hr under full vacuum to completely remove the solvents and provide a concentrated pre-dispersion. Following cooling of the pre-dispersion to 30° C., 273.67 g UVR6105, 17.39 g glycidylmethacrylate and 469.66 g acrylate polyol solution, prepared by dissolving 10% Joncryl 587 in acetone, were added thereto. Acetone was removed by vacuum distillation at 50° C. The batch was allowed to cool to ambient temperature and then charged with 188.58 g Darocur 1173 and 13.8 g Cyracure™ UVI6992. Portions of the resulting compositions were further mixed with the silicone surfactants (SF1642, SF1188a and SF1488 from General Electric Silicones) in the amounts set forth in Table 7 and the contact angles were measured after curing on polycarbonate OQ1030 discs.

TABLE 7

| | Example | | | | |
| --- | --- | --- | --- | --- | --- |
| | 26 | 27 | 28 | 29 | 30 |
| Surfactant | None | SF1642 | SF1642 | SF1188a | SF1488 |
| Surfactant charge | 0 | 0.14 | 0.035 | 0.14 | 0.14 |
| Coating base | 7 | 7 | 7 | 7 | 7 |
| Contact angle, degrees | 60.9 | 103.2 | 99.8 | 101.6 | 92.4 |

TABLE 7-continued

| | Example | | | | |
|---|---|---|---|---|---|
| | 26 | 27 | 28 | 29 | 30 |
| Pencil Hardness | >9H | >9H | >9H | >9H | >9H |
| Crosshatch Adhesion | 5B | 5B | 5B | 4B | 4B |
| Table Tilt after 24 hr standing | 0.48 | | | 0.05 | 0.19 |

As the data in Table 7 demonstrate, the Pencil Hardness and adhesion properties of the cured coatings evaluated by the Crosshatch Adhesion Test (ASTM 3359) were excellent. The coated discs also exhibited very low Table Tilt when measured 24 hours after curing.

While the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the process of the invention, but that the invention will include all embodiments falling within the scope of the appended claims.

What is claimed is:
1. A curable composition which comprises:
   a) functionalized colloidal silica obtained from the reaction of surface hydroxyl groups of colloidal silica with at least one functionalizing silane of the general formula:

$(R^1)_a Si(OR^2)_{4-a}$ wherein each $R^1$ is, independently, a monovalent alkyl, cycloalkyl, aryl, alkaryl or aralkyl group of up to 18 carbon atoms, optionally possessing at least one chemically reactive functionality selected from the group consisting of alkenyl, acrylate and epoxy; each $R^2$ is, independently, a monovalent hydrocarbon radical of up to 18 carbon atoms; and "a" is a whole number of from 1 to 3;
   b) at least one first curable monomer possessing at least one of alkenyl and acrylate functionality;
   c) at least one second curable monomer possessing epoxy functionality;
   wherein the second curable monomer is at least one epoxy resin selected from the group consisting of glycidyl ester of mono- or dicarboxylic acid, butyl glycidyl ether, phenylglycidyl ether, 2-ethylhexyl glycidyl ether, 3-cyclohexenylmethyl-3-cyclohexenylcarboxylate diepoxide, 2-(3,4-epoxy)cyclohexyl-5,5-spiro-(3,4-epoxy)cyclohexane-m-dioxane, 3,4-epoxycyclohexylmethyl-3,4-epoxycyclo-hexanecarboxylate, 3,4-epoxy-6-methycyclohexylmethyl-3,4-epoxy-6-methyl-cyclohexanecarboxylate, vinyl cyclohexanedioxide, bis(3,4-epoxycyclohexyl-methyl)adipate, bis(3,4-epoxy-6-methyl cyclohexylmethyl)adipate, exo-exo bis(2,3-epoxycyclopentyl) ether, endo-exo bis(2,3-epoxycyclopentyl) ether, 2,2-bis(4-(2,3-epoxypropoxy)cyclohexyl)propane, 2,6-bis(2,3-epoxypropoxy-cyclohexyl-p-dioxane), 2,6-bis(2,3-epoxypropoxy)norbornene, the diglycidylether of linoleic acid dimer, limonene dioxide, 2,2-bis(3,4-epoxycyclohexyl)propane, dicyclopentadiene dioxide, 1,2-epoxy-6-(2,3-epoxypropoxy)hexahydro-4,7-methanoindane, p-(2,3-epoxy)cyclopentylphenyl-2,3-epoxypropylether, 1-(2,3epoxypropoxy)phenyl-5,6-epoxyhexadydro-4,7-methanoindane, o-(2,3-epoxy)cyclopentylphenyl-2,3-epoxypropyl ether), 1,2-bis(5-(1,2-epoxy)-4,7-hexahydromethanoindanoxyl)ethane, cyclopentenylphenyl glycidyl ether, cyclohexanediol diglycidyl ether, diglycidyl hexahydrophthalate, diglycidyl ether of bisphenol A and bisphenol F, alkyl glycidyl ether; alkyl- or alkenyl-glycidyl ester; alkyl-, mono- or poly-phenol glycidyl ether; polyglycidyl ether of pyrocatechol, resorcinol or hydroquinone, 4,4-dihydroxydiphenyl methane, 4, 4'-dihydroxy-3,3'-dimethyldiphenyl methane, 4,4'-dihydroxydiphenyl dimethyl methane, 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, tris(4-hydroxyphyenyl)methane, polyglycidyl ether of the chlorination and bromination products of diphenols: polyglycidyl ether of novolacs; polyglycidyl ether of diphenols obtained by estertifying ethers of diphenols obtained by esterifying salts of an aromatic hydro carboxylic acid with a dihaloalkane or dihalogen dialkyl ether, polyglycidyl ether of polyphenol obtained by condensing a phenol and a long-chain halogen paraffin containing at least two halogen atoms; phenol novolac epoxy resin: cresol novolac epoxy resin and sorbitol glycidyl ether;
   d) at least one third curable monomer possessing at least one of alkenyl and acrylate functionality together with epoxy functionality, the third curable monomer replacing or supplementing the first curable monomer; and, optionally,
   e) at least one curing agent for the curable monomer(s).

2. The curable composition of claim 1 wherein the functionalized colloidal silica is obtained from the reaction of surface hydroxyl groups of colloidal silica with a functionalizing silane in which each $R^1$ is the same or different alkyl, cycloalkyl, aryl, aryl, alkaryl or aralkyl group.

3. The curable composition of claim 2 wherein the functionalizing silane is at least one member selected from the group consisting of phenyldimethylmethoxysilane, phenylmethyldimethoxysilane, cyclohexylmethyldimethoxysilane, phenyltrimethoxysilane and methyltrimethoxysilane.

4. The curable composition of claim 1 wherein the functionalized colloidal silica is obtained from the reaction of surface hydroxyl groups of colloidal silica with (i) a functionalizing silane in which at least one $R^1$ is, or possesses, vinyl, allyl or acrylate functionality and (ii) a functionalizing silane in which at least one $R^1$ possesses epoxy functionality.

5. The curable composition of claim 4 wherein the functionalizing silane is at least one silane selected from the group consisting of 2-(3,4-epoxycyclohexyl)ethyltrimethoxysilane, 3-glycidoxypropyltrimethoxysilane, 3-acryloxypropylmethyldiethoxysilane, 3-acryloxyproplymethyldimethoxysilane, 3-acryloxypropyltrimethoxysilane, 2-methacryloxethylmethyldiethoxysilane, 2-methacryloxyethylmethyldimethoxysilane, 2-methacryloxethyltrimethoxysilane, 2-acryloxyethyltrimethoxysilane, 3-methylacryloxypropyl trimethoxysilane, 3-methacryloxypropyl-triethoxysilane, 3-acryloxypropyltriethoxysilane, 3-acryloxypropyldimethylethoxysilane, 2-methacryloxyethyltriethoxysliane and 2-acryloxyethyltriethoxysilane.

6. The curable composition of claim 1 wherein the colloidal silica is reacted with from about 5 to about 60 weight percent thereof of functionalizing silane.

7. The curable composition of claim 1 wherein the nominal median particle size of the colloidal silica does not exceed about 250 nm.

8. The curable composition of claim 1 wherein the nominal median particle size of the colloidal silica does not exceed about 50 nm.

9. The curable composition of claim 1 wherein the nominal median particle size of the colloidal silica does not exceed about 25 nm.

10. The curable composition of claim 4 wherein the first curable monomer is multifunctional.

11. The curable composition of claim 10 wherein the multifunctional first curable monomer possesses at least two acrylate functionalities.

12. The curable composition of claim 4 wherein the second curable monomer is multifunctional.

13. The curable composition of claim 12 wherein the multifunctional second curable resin possesses at least two epoxy functionalities.

14. The curable composition of claim 4 wherein the third curable monomer possesses at least one vinyl, allyl or acrylate functionality and at least one epoxy functionality.

15. The curable composition of claim 1 wherein the first curable monomer is at least one acrylate selected from the group consisting of methyl acrylate, propyl acrylate, butylacrylate, methylmethacrylate, propylmethacrylate, butylmethacrylate, ethylihexylmethacrylate, 2-(2-ethoxyethoxy) ethyl acrylate, 2-phenoxyethyl acrylate, 2-phenoxyethyl methacrylate, alkoxylated lauryl acrylate, alkoxylated phenol acrylate, alkoxylated phenolmethacrylate, alkoxylated tetrahydrofurfuryl acrylate, capro lactone acrylate, cyclic trimethylolpropane formal acrylate, dicyclopentadienyl methacrylate, ethoxylated (10) hydroxyethyl methacrylate, ethoxylated (4) nonyl phenol acrylate, ethoxylated (4) nonyl phenol methacrylate, ethoxylated nonyl phenol acrylate, isobomyl acrylate, isobornyl methacrylate, isodecyl acrylate, isodecyl methacrylate, isooctyl acrylate, lauryl acrylate, lauryl methacrylate, methacrylate functional monomer, methoxy polyethylene glycol (350) mono acrylate, methoxy polyethylene glycol (350) monomethacrylate, methoxy polyethylene glycol (550) monoacrylate, methoxy polyethylene glycol (550) monomethacrylate, polyurethane acrylate, polyurethane methacrylate, octyldecyl acrylate, polypropylene glycol monomethacrylate, propoxylated (2) allyl methacrylate, stearyl acrylate, stearyl methacrylate, tetrahydrofurfuryl acrylate, tetrahydrofurfuryl methacrylate, tridecyl acrylate, tridecyl methacrylate, 1,3-butylene glycol diacrylate, 1,3-butylene glycol dimethacrylate, 1,4-butanediol diacrylate, 1,4-butanediol dimethacrylate, 1, 6- hexanediol diacrylate, 1,6-hexanediol dimethacrylate, alkoxylated cyclohexane dimethanol diacrylate, alkoxylated cyclOhexane dimethanol diacrylate, alkoxylated cyclohexane dimethanol dimethacrylate, alkoxylated hexanediol diacrylate, alkoxylated hexanediol dimethacrylate, alkoxylated neopentyl glycol diacrylate, alkoxylated neopentyl glycol dimethacrylate, cyclohexane dimethanol diacrylate, cyclohexane dimethanol dimethacrylate, diethylene glycol diacrylate, diethylene glycol dimethacrylate, dipropylene glycol diacrylate, dipropylene glycol dimethacrylate, ethoxylated (10) bisphenol A diacrylate, ethoxylated (1) bisphenol A dimethacrylate, ethoxylated (2) bisphenol A diacrylate, ethoxylated (2) bisphenol A dimethacrylate, ethoxylated (3) bisphenol A diacrylate, ethoxylated (3) bisphenol A dimethacrylate, ethoxylated (30) bisphenol A diacrylate, ethoxylated (30) bisphenol A dimethacrylate, ethoxylated (4) bisphenol A diacrylate, ethoxylated (4) bisphenol A dimethacrylate, ethoxylated (8) bisphenol A dimethacrylate, ethoxylated (8) bisphenol A dimethacrylate, ethoxylated (6) bisphenol A diimethacrylate, ethoxylated (6) bisphenol A dimethacrylate, ethylene glycol diacrylate" ethylene glycol dimethacrylate, neopentyl glycol diacrylate, neopentyl glycol dimethacrylate, polyethylene glycol (200) diacrylate, polyethylene glycol (200) dimethacrylate, polyethylene glycol (400) diacrylate, polyethylene glycol (400) dimethacrylate, polyethylene glycol (600) diacrylate, polyethylene glycol (600) dimethacrylate, polypropylene (400) diacrylate, polypropylene glycol (400) dimethacrylate, propoxylated (2) neopentyl glycol diacrylate, propoxylated (2) neopentyl glycol dimethacrylate, tetraethylene glycol diacrylate, tetraethylene glycol dimethacrylate, tricyclodecane dimethanol diacrylate, tricyclOdecane dimethanol dimethacrylate, triethylene glycol diacrylate, triethylene glycol dimethacrylate, tripropylene glycol diacrylate, tripropylene glycol dimethacrylate, ethoxylated (15) trimethylolpropane triacrylate, ethoxylated (3) trimethylolpropane triacrylate, ethoxylated (15) trimethyloipropane triacrylate, ethoxylated (6) trimethylolpropane triacrylate, ethoxylated (9) trimethylolpropane triacrylate, ethoxylated (20) trimethylolpropane triacrylate, highly propoxylated (5,5) glyceryl triacrylate, low viscosity trimethyloipropane triacrylate, pentaerythritol triacrylate, propoxylated (3) glyceryl triacrylate, propoxylated (3) glyceryl trimethacrylate, propoxylated (3) trimethylolpropane triacrylate, propoxylated (6) trimethylolpropane triacrylate, trimethyloipropane triacrylate, trimethylo ipropane trimethacrylate, tris (2-hydroxyethyl) isocyanurate triacrylate, tris (2-hydroxyethyl) isocyanurate triacrylate, ditrimethylolpropane tetraacrylate, dipentaerythritol pentaacrylate, ethoxylated (5) pentaerythritol tetraacrylate, low viscosity dipentaerythritol pentaacrylate, pentaacrylate ester, pentaerythritol tetraacrylate, alkyl (novolac) acrylate and urethane diacrylate.

16. The curable composition of claim 1 wherein the third curable monomer is at least one member selected from the group consisting of allyl glycidyl ether, vinyl glycidyl ether, glycidyl acrylate, glycidyl methacrylate, phenol novolak epoxide acrylate or methacrylate, cresol novolak epoxide acrylate or methacrylate and bisphenol A epoxide acrylate or methacrylate.

17. The cured composition of claim 1.
18. The cured composition of claim 2.
19. The cured composition of claim 4.
20. The cured composition of claim 10.
21. The cured composition of claim 12.

22. An article which comprises a cured composition of claim 1 adhered to at least a portion of a surface thereof.

23. The article of claim 22 which is a substrate of at least one of synthetic polymer, metal, metal alloy, glass, ceramic or wood.

24. The article of claim 22 which is an optical information storage medium.

25. The article of claim 22 which is a digital versatile disc.
26. The article of claim 22 which is a Blu-ray Disc.
27. The curable composition of claim 1,
wherein the functionalizing silane comprises methacryloxypropyltrimethoxysilane;
wherein the first curable monomer is selected from the group consisting of tricyclodecane dimethanol diacrylate, acrylate polyol, hexanediol diacrylate, and mixtures thereof;
wherein the second curable monomer comprises epoxycyclohexylmethyl-3,4-epoxycyclohexanecarboxylate or bisphenol A diglycidyl ether;
wherein the third curable monomer comprises glycidyl methacrylate; and
wherein the curing agent comprises a cationic photoinitiator and a free radical initiator.

* * * * *

UNITED STATES PATENT AND TRADEMARK OFFICE
CERTIFICATE OF CORRECTION

PATENT NO. : 7,622,514 B2 Page 1 of 1
APPLICATION NO. : 11/302850
DATED : November 24, 2009
INVENTOR(S) : Liao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1014 days.

Signed and Sealed this

Twenty-sixth Day of October, 2010

David J. Kappos
*Director of the United States Patent and Trademark Office*